United States Patent [19]

Neely et al.

[11] 3,831,712
[45] Aug. 27, 1974

[54] MECHANISM FOR TRANSPORTING LOADS INTO A HIGH RISE BUILDING

[76] Inventors: Tom D. Neely, 4080 W. 1st St., Santa Ana, Calif.; Jack M. Linneen, 8015 Highland Trl., Los Angeles, Calif. 90046

[22] Filed: Dec. 22, 1972

[21] Appl. No.: 317,633

[52] U.S. Cl. .................. 187/2, 187/9, 214/16 R
[51] Int. Cl. ............................................. B66b 9/18
[58] Field of Search ..................... 187/2, 6, 7, 9; 214/16.1 A, 16.1 C, 16.1 CC, 16.1 CE, 16.1 CF, 16.4 A, 16.4 B, 16.4 R

[56] References Cited
UNITED STATES PATENTS

| | | | |
|---|---|---|---|
| 1,178,498 | 4/1916 | Cull | 214/730 X |
| 1,816,336 | 7/1931 | Miltenberger | 193/35 R |
| 2,118,195 | 5/1938 | Hague | 193/35 R |
| 2,276,182 | 3/1942 | Garand | 212/71 |
| 2,496,399 | 2/1950 | Lesser | 214/16.4 A X |
| 2,760,617 | 8/1956 | Bowen | 193/35 |
| 3,081,857 | 3/1963 | Krueger | 193/35 R |
| 3,095,956 | 7/1963 | McGill | 193/35 A |
| 3,587,874 | 6/1971 | Graf | 193/35 R |

FOREIGN PATENTS OR APPLICATIONS 1,177,763   1/1970   Great Britain ................... 193/35 R

*Primary Examiner*—James B. Marbert
*Assistant Examiner*—W. Scott Carson
*Attorney, Agent, or Firm*—Jessup & Beecher; Keith D. Beecher

[57] ABSTRACT

A mechanism is provided for loading heavy loads, such as bundles of wallboards, or other materials, into a multi-story high rise building. The mechanism includes a hoist which lifts the bundles directly from a truck to any floor of the building, and a portable inclined conveyor of a particular construction positioned on the floor on which the bundle is to be unloaded, the conveyor partially overhanging the edge of the building to receive the bundle from the hoist and to transfer the bundle into the interior of the building.

3 Claims, 5 Drawing Figures

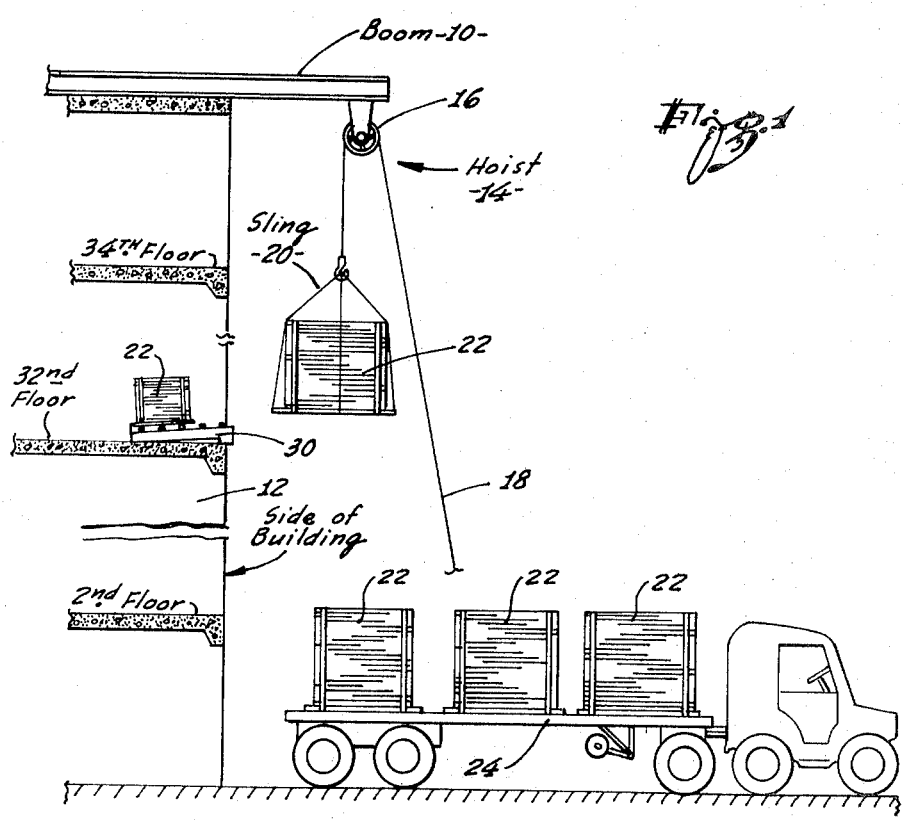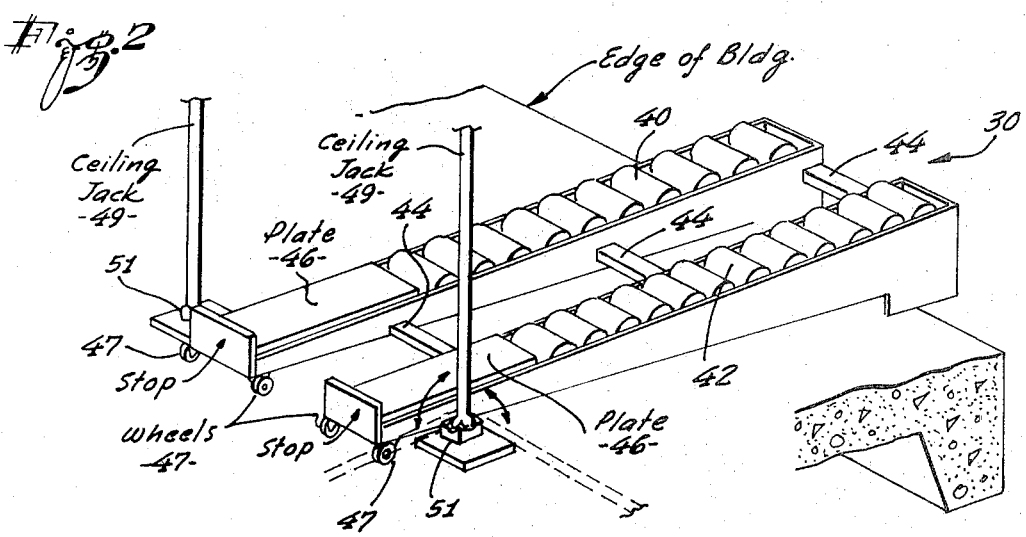

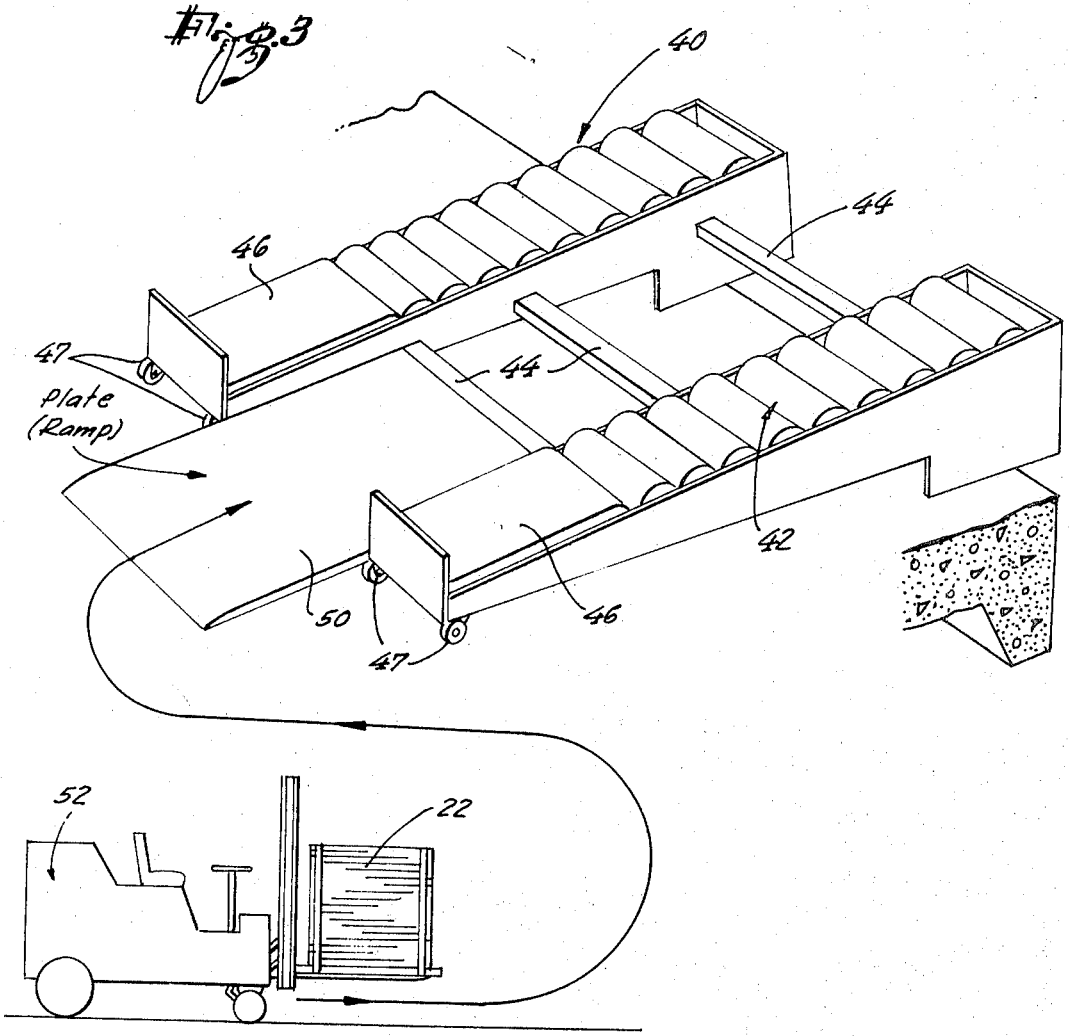

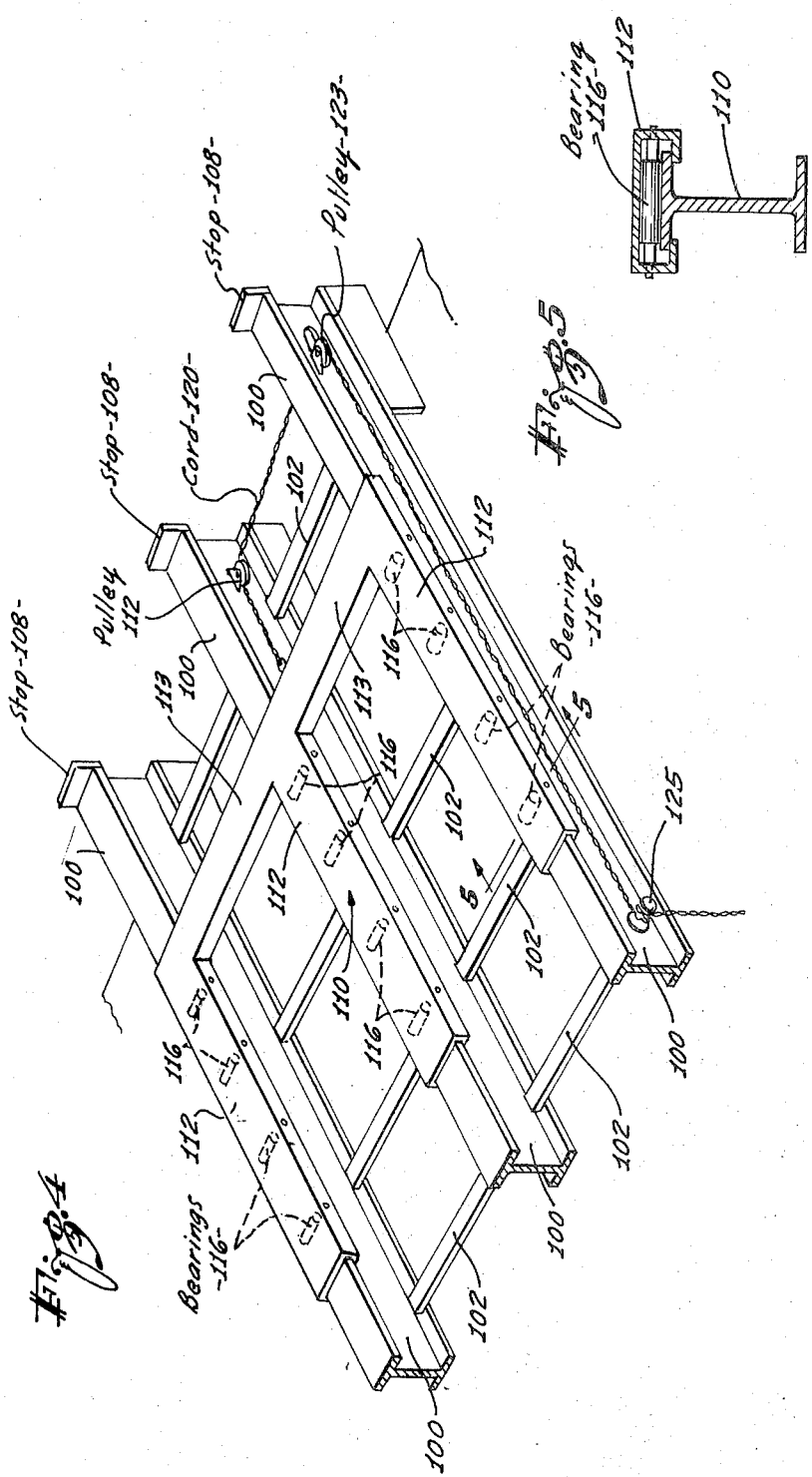

MECHANISM FOR TRANSPORTING LOADS INTO A HIGH RISE BUILDING

BACKGROUND OF THE INVENTION

The present day practice for transporting bundles of wallboard, or other materials, from a truck into a high rise building usually consists of first unloading the truck by means, for example, of a fork lift, and of placing the bundles on the sidewalk, or road, around the truck in the vicinity of the building. The bundles are then loaded individually into a usual personnel elevator to be hoisted to the various floors of the building. The bundles are then picked up by another fork lift at each floor and unloaded from the elevator.

The aforesaid prior art practice is slow and inefficient, and it causes congestion in the vicinity of the building. Also, due to the restricted dimensions of the personnel elevator, the size of the bundles which can be transported thereby is limited. In the practice of the present invention, on the other hand, there is no need to use the personnel elevator, and there is no need to unload the bundles from the truck onto the street.

Instead, the bundles are hoisted directly from the truck by a hoist to a portable conveyor of a unique construction which is set up on the floor which is to receive the bundle. The bundle is then swung onto the conveyor, for example, by means of a boat hook, or the like, and it slides down the conveyor into position to be transported by a lift truck to the desired location on the floor.

The mechanism of the invention, in addition to being more efficient than the prior art practice, also permits larger and heavier bundles to be loaded directly into the building, and more rapidly than the prior art practice, and with a fraction of the personnel required when the prior art practice is followed.

BRIEF DESCRIPTION OF THE DRAWINGS

FIG. 1 is a schematic representation showing the mechanism of one embodiment of the invention actually unloading a truck into a selected floor of a building;

FIG. 2 is a perspective representation of a roller conveyor component of the mechanism of the invention, in accordance with one embodiment;

FIG. 3 shows a second embodiment of the roller conveyor component;

FIG. 4 shows another embodiment of the conveyor component of the invention; and

FIG. 5 is a section along the line 5—5 of FIG. 4.

DETAILED DESCRIPTION OF THE ILLUSTRATED EMBODIMENTS

As shown in FIG. 1, the mechanism of the invention includes a boom 10 which is mounted on the top of a building 12, and which extends over the side of the building. The boom 10, for example, is capable of withstanding up to 8,000 pounds. A hoist 14 is suspended by the boom 10, and it includes a usual pulley 16 and cord 18. The cord 18 is attached to a sling 20, and the cord and sling may be composed, for example, of nylon. The nylon cord and sling are capable, for example, of supporting up to 12 tons.

The bundles 22 of wallboard, or other materials, are transported by a truck 24 to the site of the building, and the hoist 14 serves directly to lift the bundles from the truck to the desired floor level in the building 12. A roller conveyor 30 of the type shown, for example, in FIGS. 2 or 3, is portable in nature, and it may be transported from floor to floor. The roller conveyor 30 is hoisted by the hoist 14, for example, and is positioned on the floor on which the bundle is to be unloaded. Wheels 47 at the end of the conveyor facilitate the unloading of the conveyor from the hoist and the proper positioning of the conveyor. As shown in FIG. 1, the end of the conveyor protrudes slightly beyond the edge of the building.

In the practice of the invention, the bundle 22 in the sling 20 is pulled inwardly by means of a boat hook, or other appropriate instrument, onto the conveyor 30. The bundle 22 then rolls down the conveyor into the interior of the building, into a position where it can be lifted off the conveyor, for example, by a fork lift truck, and transported to a desired location on the floor.

The roller conveyor 30 may be anchored in place on the floor 32 by means of appropriate ceiling jacks 49. The jacks may be coupled to the conveyor by universal joints, such as the joint 51, to permit the jacks to be turned down into the plane of the conveyor when not in use. For example, if the first bundle 22 is carefully drawn inwardly onto the roller 30, it can form an anchor for the roller conveyor for each successive bundle 22. In that event, the first bundle is removed only after the second bundle, in each instance, has been received by the conveyor and transported inwardly thereby beyond the edge of the building.

As shown in FIG. 2, the conveyor 30 is made up of two separate roller conveyors 40 and 42 which are held in spaced and parallel relationship by transverse members 44. The conveyors 40 and 42 are shaped to be inclined downwardly towards the interior of the building, when the conveyor is positioned as shown in FIG. 2. Appropriate plates 46 may be provided at the lower end of the conveyor for braking the load; or braking rollers may be used at the lower end of the conveyor, such as described, for example, in U.S. Pat. Nos. 3,180,472 and 3,245,510.

The roller conveyor shown in FIG. 3 is generally similar to the conveyor shown in FIG. 2, and like components have been designated by the same numbers. In the latter conveyor, a plate 50 is interposed between the components 40 and 42 and is affixed to the components. A fork lift, such as the fork lift 52 is run up onto the plate 50 to remove the bundles 22 from the conveyor, and is maintained on the plate 50 as the conveyor receives each load, so as to constitute an anchoring weight for the conveyor. In the latter embodiment the ceiling jacks may be dispensed with, if so desired.

In the embodiment of FIG. 4, the conveyor is formed of three I-beams 100 which are held in spaced and parallel relationship by transverse members 102. The I-beams 100, like the components 40 and 42 of the previous embodiments are held in an inclined position to overhang slightly the edge of the building. The lower end of the conveyor of FIG. 4, (not shown) may have a ramp 50 like the previous conveyor of FIG. 3, and it may be hoisted from floor to floor by the hoist 14 of FIG. 1. Moreover, it may be positioned in place with the help of wheels like the wheels 47 of FIG. 3 at the inner ends of the I-beams 100. Stops 108 are provided at the outer ends of the I-beams.

An E-shaped wheeled carriage 110 in the form of three spaced strip members 112 and an interconnecting member 113, is positioned on the I-beams 100. The strip members 112 have side edges which overhang the edges of the I-beams and act as guides as shown in FIG. 5. The carriage is supported on a plurality of bearings 116, so that it may slide freely up and down the I-beams.

A nylon line 120 is secured to the carriage 110, and it extends around pulleys 122 and 123 at the outer ends of two of the I-beams, as shown, and around a bollard 125. The line serves as a means for returning the carriage 110 to its upper position to receive a new load, after a previous load has been removed from the carriage. When a new load is received on the carriage, it is permitted to move down the I-beams to the inner ends thereof, and a controlled braking of the carriage may be effectuated by the operator holding the line and permitting it to slip around the bollard.

The I-beams 100 may be held in place by ceiling jacks, such as the jacks 49 of FIG. 2, or by means of the ramp plate technique of FIG. 3 as mentioned above. For wider loads, additional I-beams may be used adjacent the I-beams 100, and wider carriages, or adjustable carriages may be used in conjunction with the additional I-beams. For narrower loads, two I-beams may be used.

The invention provides, therefore, simple and efficient mechanisms for loading bundles of wallboard, or other products, into a multi-story high rise building. It will be appreciated that while particular embodiments of the invention have been shown and described, modifications may be made, and it is intended in the following claims to cover all modifications which come within the spirit and scope of the invention.

What is claimed is:

1. In an assembly for transporting bundles to a high rise multi-story building and which comprises a boom mounted on the building and projecting beyond the side of the building, and a hoist supported on the boom for transporting bundles from a truck to any floor of the building; the combination of at least two spaced and parallel conveyors attached to one another and positioned on a floor of the building projecting partially beyond the edge of the building for receiving the bundle from the hoist, and inclined downwardly towards the interior of the building for transporting the bundle from the interior of the building, and means for anchoring the inner end of the conveyor to the floor of the building, said anchoring means including a plate interposed between the parallel conveyors for receiving a fork lift truck to remove the bundles from the conveyors and to cause the truck to anchor the inner ends of the conveyors to the floor.

2. The assembly defined in claim 1, in which said spaced and parallel conveyors each includes a multiplicity of rollers.

3. The assembly defined in claim 1, and which includes wheels mounted at the inner end of each of the conveyors on the floor of the building.

* * * * *